US010838074B2

(12) United States Patent
Zuber

(10) Patent No.: US 10,838,074 B2
(45) Date of Patent: Nov. 17, 2020

(54) METHOD AND SYSTEMS FOR RESTORING A GPS SIGNAL

(71) Applicant: SRC, Inc., North Syracuse, NY (US)

(72) Inventor: Richard E. Zuber, East Syracuse, NY (US)

(73) Assignee: SRC, Inc., North Syracuse, NY (US)

( * ) Notice: Subject to any disclaimer, the term of this patent is extended or adjusted under 35 U.S.C. 154(b) by 0 days.

(21) Appl. No.: 16/298,490

(22) Filed: Mar. 11, 2019

(65) Prior Publication Data

US 2019/0204453 A1 Jul. 4, 2019

Related U.S. Application Data

(63) Continuation of application No. 15/055,213, filed on Feb. 26, 2016, now Pat. No. 10,267,923.

(60) Provisional application No. 62/120,943, filed on Feb. 26, 2015.

(51) Int. Cl.
| | |
|---|---|
| *G01S 19/27* | (2010.01) |
| *G01S 19/11* | (2010.01) |
| G01S 19/18 | (2010.01) |
| G01S 19/21 | (2010.01) |

(52) U.S. Cl.
CPC .............. *G01S 19/27* (2013.01); *G01S 19/11* (2013.01); *G01S 19/18* (2013.01); *G01S 19/21* (2013.01)

(58) Field of Classification Search
CPC ........ G01S 19/27; G01S 19/11; G01S 19/258; G01S 19/05; G01S 19/24; H04W 4/02
USPC .................................................. 342/357.66
See application file for complete search history.

(56) References Cited

U.S. PATENT DOCUMENTS

| | | | | |
|---|---|---|---|---|
| 5,983,159 A | * | 11/1999 | Schipper ................... | G01S 5/14 |
| | | | | 701/469 |
| RE37,408 E | * | 10/2001 | Loomis .................... | G01S 19/06 |
| | | | | 342/357.75 |
| 6,301,545 B1 | * | 10/2001 | Brodie ................. | G01C 21/005 |
| | | | | 342/352 |
| 7,119,742 B2 | * | 10/2006 | Cho ........................ | G01S 19/42 |
| | | | | 342/357.25 |
| 7,724,698 B2 | * | 5/2010 | Morris ............... | H04B 7/18595 |
| | | | | 370/316 |
| 9,798,010 B2 | * | 10/2017 | Fischer .................... | G01S 19/06 |
| 9,829,558 B2 | * | 11/2017 | Robinson ................ | G01S 19/10 |
| 2002/0072854 A1 | * | 6/2002 | Fuchs .................... | G01S 5/0036 |
| | | | | 701/469 |
| 2003/0154025 A1 | * | 8/2003 | Fuchs .................... | G01S 5/0036 |
| | | | | 701/469 |
| 2008/0191939 A1 | * | 8/2008 | Yu ........................... | G01S 19/24 |
| | | | | 342/357.63 |
| 2013/0141278 A1 | * | 6/2013 | Rao ........................ | G01S 19/02 |
| | | | | 342/357.44 |
| 2014/0327575 A1 | * | 11/2014 | Rao ........................ | G01S 19/05 |
| | | | | 342/357.63 |

(Continued)

*Primary Examiner* — Harry K Liu

(74) *Attorney, Agent, or Firm* — Bond Schoeneck & King, PLLC; George McGuire

(57) ABSTRACT

A method and system for restoring a GPS signal is provided. The method including the steps of receiving a target location, receiving location of visible satellites, calculating a transmit delay, calculating a Doppler offset, calculating a chipping offset, computing navigating data and PRN codes, formulating signals using the transmit delay, Doppler offset, chipping offset, navigation data and PRN codes, and transmitting the formulated signal.

22 Claims, 3 Drawing Sheets

(56) References Cited

U.S. PATENT DOCUMENTS

2015/0061934 A1\* 3/2015 Liu .................... G01S 19/21
    342/357.69

\* cited by examiner

METHOD AND SYSTEMS FOR RESTORING A GPS SIGNAL

CROSS-REFERENCE TO RELATED APPLICATIONS

This is a continuation of U.S. patent application Ser. No. 15/055,213, filed on Feb. 26, 2016, the contents of which is relied upon and incorporated herein by reference in its entirety, which claims the benefit of U.S. Provisional Patent Application Ser. No. 62/120,943, filed on Feb. 26, 2015 and entitled "Method and Systems for Restoring a GPS Signal," the entire disclosure of which is incorporated herein by reference, and the benefit of priority to each of these applications under 35 U.S.C. § 120 is hereby claimed.

FIELD OF THE INVENTION

The present disclosure is directed to methods and systems for restoring a GPS signal, and more specifically, for restoring a GPS signal from an arbitrary position.

BACKGROUND

The Global Position System (GPS) provides location and time information to any user who can obtain an unobstructed view of four or more GPS satellites. As a result, GPS has achieved near ubiquitous use in both civilian and military applications, such as in aircraft and automotive navigation, and in handheld navigation devices.

GPS has particular value on the battlefield, where knowledge of location is paramount to effective navigation and maneuvers. However, battlefield environments of the future hold challenges that are different from today's threats. Spectrum resources may become limited due to intentional or unintentional jamming, including jamming of GPS signals. Due to the broad use of GPS as a navigational tool on a myriad of military and civilian devices, the absence of the GPS signals create scenarios that threaten the safety of lives.

Accordingly, there exists a need in the art for the generation and transmission of GPS signals from a multi-function electronic warfare platform to restore GPS for both military and civilian applications.

SUMMARY

The present disclosure is directed to inventive methods and systems for restoring a GPS signal to a target in a GPS-denied environment. Accordingly, various embodiments herein are directed to method and system in which a device recreates and transmits a broadcast-synchronized GPS signal to a target.

According to an aspect is a non-transitory storage medium storing program code for implementing an algorithm for restoring a GPS signal, the algorithm comprising the steps of: receiving a location of a target; calculating, for each of a plurality of visible GPS satellites each having a location, a GPS signal as it would be received by the target according to the location of the target and the location of each of the plurality of visible GPS satellites; providing each of the calculated GPS signals to a transmitter such that the each calculated signal may be transmitted to the target.

According to an embodiment, the step of calculating comprises the step of a calculating a transmit delay for each of the plurality of visible GPS satellites.

According to an embodiment, the step of calculating comprises the step of calculating a Doppler shift for each of the plurality of visible GPS satellites.

According to an embodiment, the step of calculating comprises the step of calculating a chipping frequency offset for each of the plurality of visible GPS satellites.

According to an embodiment, the step of calculating comprises the step of determining navigation data for each of the plurality of visible GPS satellites.

According to an embodiment, the transmit delay for each satellite is calculated according to the following equation:

$$\text{delay} = \frac{R}{c} - (A_{f0} + tA_{f1}) - \frac{R_a}{c}$$

wherein R is a slant range between each satellite and the target, c is the speed of light constant, $A_{f0}$ is a constant offset, $A_{f1}$ is a linear offset, t is the epoch of the ephemeris, $R_a$ is the distance between the transmitter and the target, and c is the speed of light.

According to an embodiment, the Doppler shift for each of the plurality of visible satellites is calculated according to the following equation:

$$f_d = \frac{f_c \Delta R}{c}$$

wherein $f_d$ is a frequency of the Doppler shift, $f_c$ is a GPS center frequency, $\Delta R$ is a change in slant range between each satellite and the target, and c is the speed of light constant.

According to an embodiment, the change in slant rate is calculated according to the following equation:

$$\Delta R = R_{current} - R_{next}$$

wherein $R_{current}$ is a slant range between the target and each satellite, and $R_{next}$ is a future estimated slant range between the target and each of the plurality of visible satellites.

According to an embodiment, the chipping frequency offset is calculated according to the following equation:

$$\Delta f_{ct} = \frac{f_{ct}}{\left(1 + \frac{f_d}{f_c}\right)} - f_{ct}$$

wherein $f_{ct}$ is a nominal chipping frequency, $f_d$ is a Doppler shift, $f_c$ is a GPS center frequency.

According to an embodiment, determining the navigation data comprises selecting, for each of the plurality of visible satellites, a PRN code, and determining a navigation data for of the plurality of visible satellites according to a time.

According to another aspect is a method of restoring a GPS signal, the method comprising the steps of: receiving a location of a target; calculating, for each of a plurality of visible GPS satellites each having a location, a GPS signal as it would be received by the target according to the location of the target and the location of each of the plurality of visible GPS satellites; transmitting the calculated signal of each of the plurality of visible GPS satellites to the target.

According to an embodiment, the step of calculating comprises the step of a calculating a transmit delay for each of the plurality of visible GPS satellites.

According to an embodiment, the step of calculating comprises the step of calculating a Doppler shift for each of the plurality of visible GPS satellites.

According to an embodiment, the step of calculating comprises the step of calculating a chipping frequency offset for each of the plurality of visible GPS satellites.

According to an embodiment, the step of calculating comprises the step of determining navigation data for each of the plurality of visible GPS satellites.

According to an embodiment, the transmit delay for each satellite is calculated according to the following equation:

$$\text{delay} = \frac{R}{c} - (A_{f0} + tA_{f1}) - \frac{R_a}{c}$$

wherein R is a slant range between each satellite and the target, c is the speed of light constant, $A_{f0}$ is a constant offset, $A_{f1}$ is a linear offset, t is the epoch of the ephemeris, $R_a$ is the distance between the transmitter and the target, and c is the speed of light.

According to an embodiment, the Doppler shift for each of the plurality of visible GPS satellites is calculated according to the following equation:

$$f_d = \frac{f_c \Delta R}{c}$$

wherein $f_d$ is a frequency of the Doppler shift, $f_c$ is a GPS center frequency, $\Delta R$ is a change in slant range between each satellite and the target, and c is the speed of light constant.

The method of claim 17, wherein the change in slant rate is calculated according to the following equation:

$$\Delta R = R_{current} - R_{next}$$

wherein $R_{current}$ is a slant range between the target and each satellite, and $R_{next}$ is a future estimated slant range between the target and each of the plurality of visible GPS satellites.

According to an embodiment, the chipping frequency offset is calculated according to the following equation:

$$\Delta f_{ct} = \frac{f_{ct}}{\left(1 + \frac{f_d}{f_c}\right)} - f_{ct}$$

wherein $f_{ct}$ is a nominal chipping frequency, $f_d$ is a Doppler shift, $f_c$ is a GPS center frequency.

According to an embodiment, determining the navigation data comprises selecting, for each of the plurality of visible satellites, a PRN code, and determining a navigation data for of the plurality of visible satellites according to a time.

These and other aspects of the invention will be apparent from the embodiment(s) described hereinafter.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure is directed to inventive methods and systems for restoring a GPS signal to a target in a GPS-denied environment. Accordingly, various embodiments herein are directed to method and system in which a device recreates and transmits a broadcast-synchronized GPS signal to a target.

Figure 1:
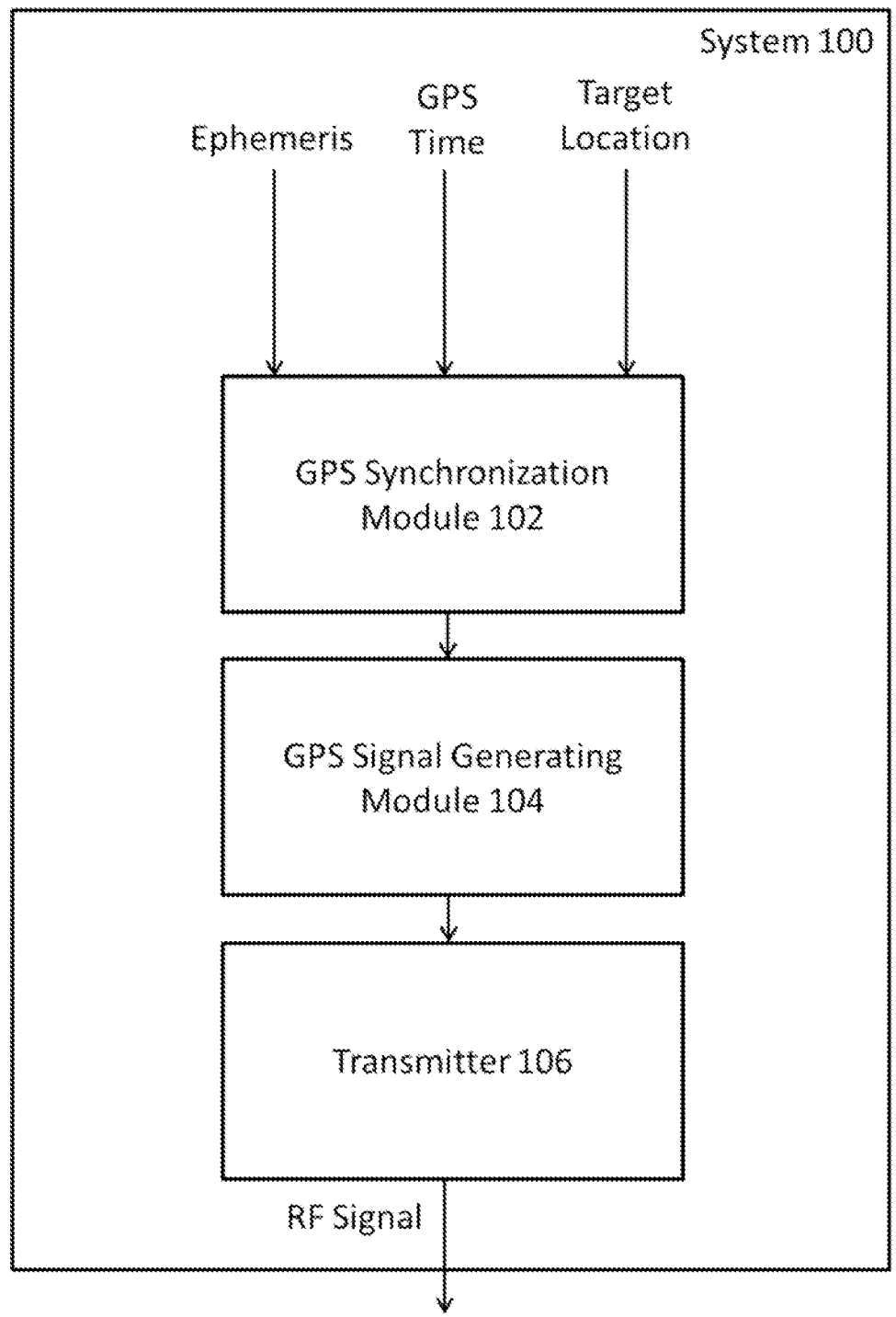
FIG. 1 is a block diagram of a GPS restoration system in accordance with an embodiment.

Referring now to the drawings wherein like reference numerals refer to like parts throughout, there is shown in FIG. 1, a block diagram of a system 100 for transmitting a broadcast-synchronized GPS signal to a target. In an embodiment, system 100 may be located on permanent or temporary ground-based location, or a moving or movable platform such as a ship, truck, or airplane.

Figure 2:
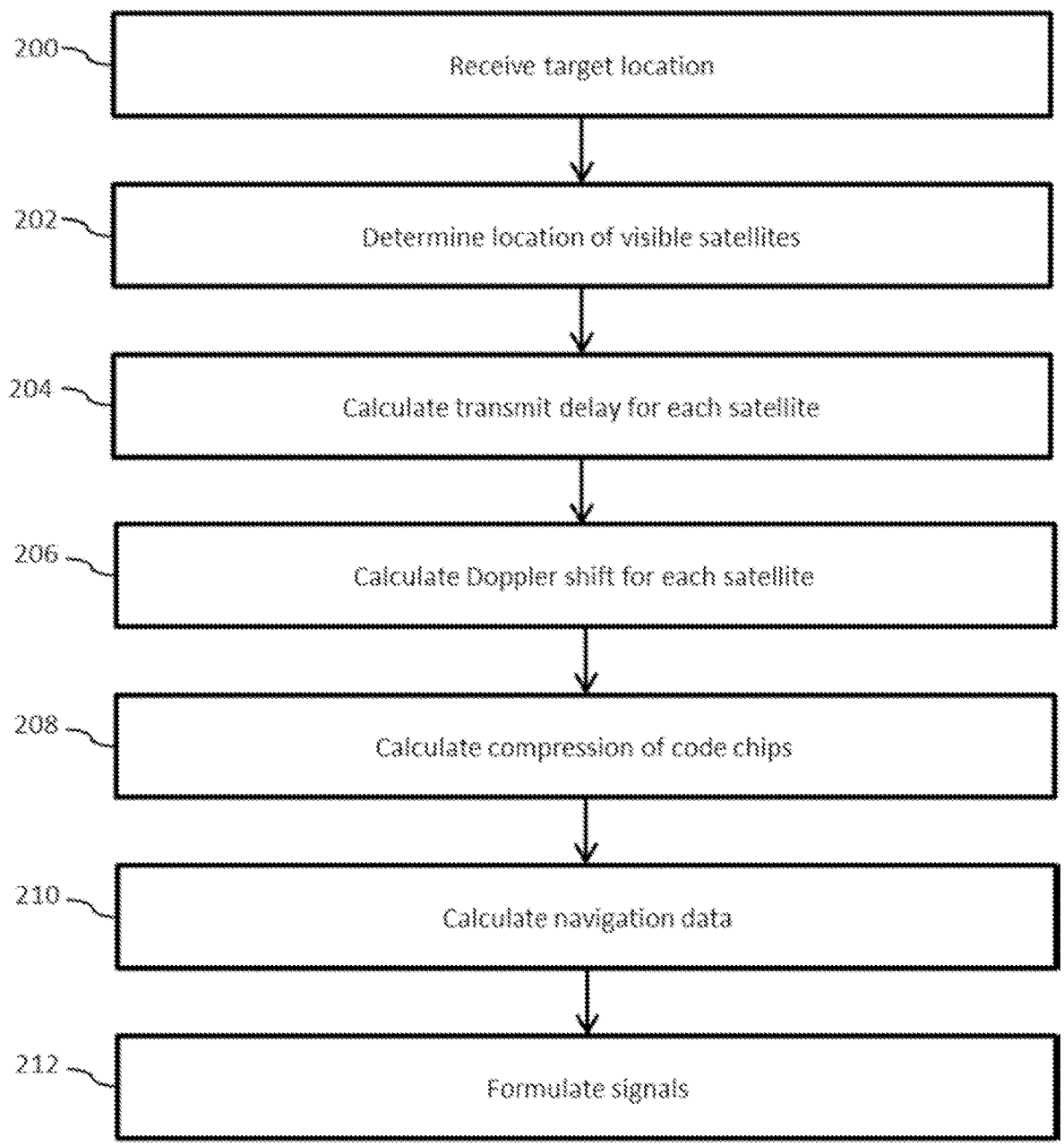
FIG. 2 is a flowchart of a GPS restoration method in accordance with an embodiment.

System 100 may, in an embodiment, include a GPS synchronization module 102, as shown in FIG. 2, configured to calculate a plurality of parameters for mirroring a broadcast signal as is received or as would be received by a target. Some parameters calculated by GPS synchronization module 102 may include a chipping offset, a Doppler offset, a receive delay, and broadcast synchronized navigation data. One of ordinary skill in the art will recognize that GPS synchronization module may calculate these parameters and other parameters may be necessary to accurately mirror a GPS broadcasted signal.

GPS synchronization module 102 may receive as inputs a present location or present location estimate of a target, and the current GPS time and the GPS constellation ephemeris data. The present location or present location estimate of the target may be received from a radar system tracking the target, from the target itself or from any other known system or method for tracking or otherwise determining the location of a target. The position may be received as a relative position, such as a distance from a known location (i.e. the location of a radar transmitter) or as a coordinate in a coordinate system such as the Earth Centered, Earth Fixed (ECEF) coordinate system. The GPS time and constellation ephemeris data may be live data as received from current ephemeris data transmitted by visible satellites. For example, system 100 may include a GPS module for receiving data, in the form of Ephemeris or almanac data, from visible satellites. Alternatively, GPS synchronization module 102 may receive from an external system the live GPS information, such as through public data on the internet or through a private network. This may be necessary where System 100 is itself in a GPS-denied environment. System 100 may also receive data from assisted GPS services. In yet another embodiment, the GPS information may be extracted from a preloaded or otherwise previously received almanac using the last known location of system 100 and/or last-known ephemeris or almanac data. In this embodiment, the GPS transmission will only remain locked as long as System 100 clock may remain time-aligned with the GPS clock. To mitigate this, an atomic clock or other accurate time measurement method may be employed.

As mentioned previously, GPS synchronization module 102 calculates a number of parameters such as a receive delay, a chipping offset, a Doppler offset, a transmission delay offset, and the proper navigation data for the start of the subframe. One of ordinary skill will recognize that other parameters may be calculated in order to accurately mirror a broadcasted GPS signal. Furthermore, one of ordinary skill will also recognize that these parameters may be calculated in any order, and according to any number of methods, as may be required by the data available to GPS synchronization module 102 or as is most efficient. Each of these parameters is discussed below.

Figure 3:
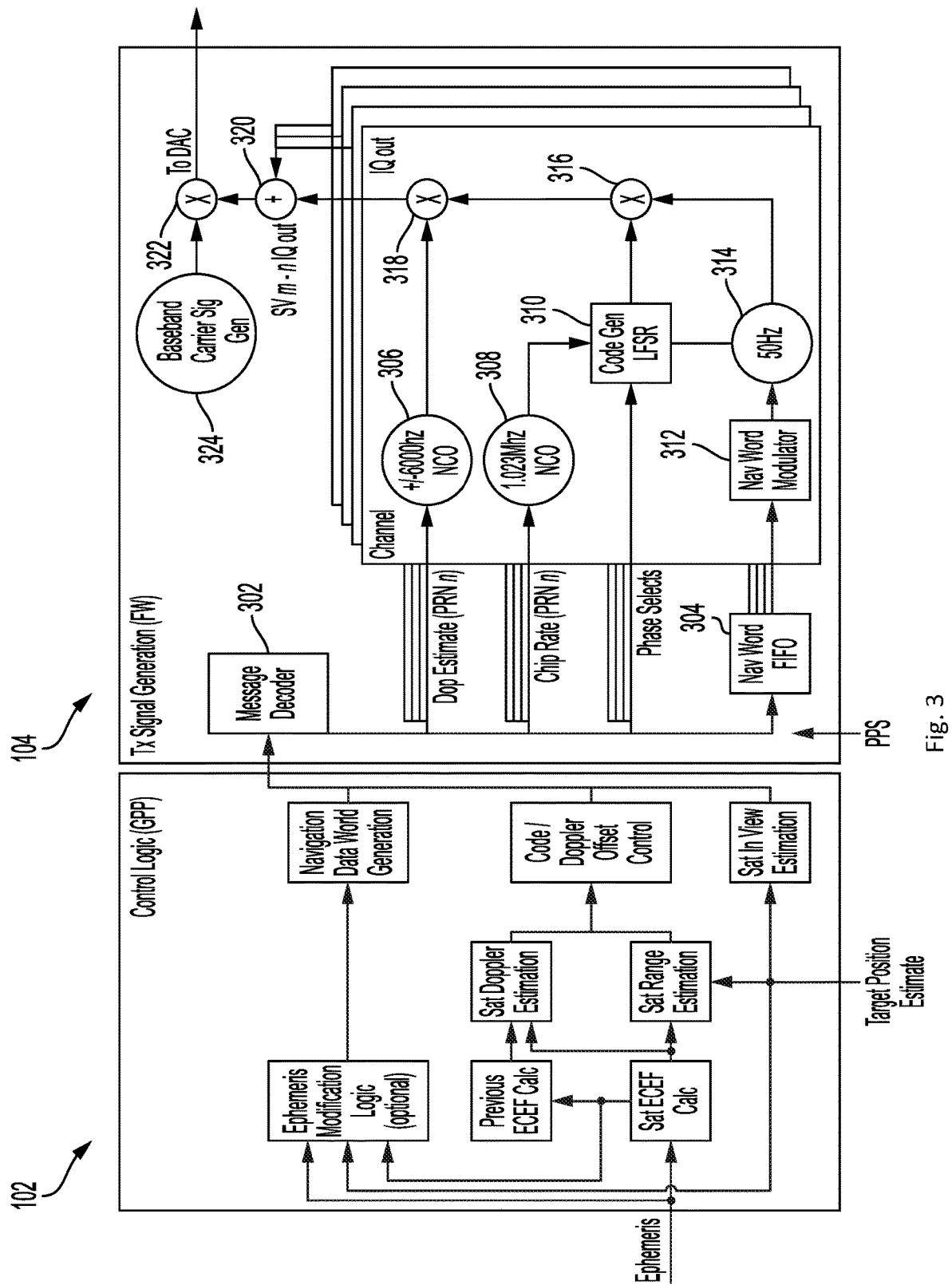
FIG. 3 shows a schematic representation of a GPS restoration system in accordance with an embodiment.

System 100 may further comprise firmware or software defining a GPS signal generating module 104. According to one embodiment, GPS signal generating module 104 may be defined on a field programmable gate array (FPGA) or on an application specific integrated circuit (ASIC), in communication with GPS synchronization module 102 via a messaging protocol as are known in the art. In an alternate embodiment, GPS signal generating module 104 may be defined by software stored on a non-transitory medium, or as firmware. GPS signal generating module 104 is configured to generate the baseband signal to be transmitted to the target. FIG. 3, shows an embodiment of GPS signal generating module 104. As shown in FIG. 3, according to one embodiment, GPS signal generating module 104 may create n transmit channels, each channel defining a satellite to restore with the proper ranging code and navigation data.

Furthermore, according to an embodiment, GPS signal generating module 104 may include a memory buffer for temporarily storing the navigation data received from GPS synchronization module 102 in a queue to be transmitted. GPS signal generating module 104 is further adapted to configure each channel to simulate the broadcasted signal using the parameters received from GPS synchronization module 102. According to an embodiment the Doppler shifts and chipping offsets are generated using a numerically controlled oscillator (NCO). In an alternative embodiment, the Doppler shifts and chipping offsets may be generated by one NCO that is time multiplexed between generating the Doppler shift and the chipping offset. As each baseband signal is generated for each satellite, GPS signal generating module 104 may be further configured to sum the channels, outputting a digital baseband signal to be transmitted. One of ordinary skill in the art will recognize that the signals and offsets may be generated according to any other means known in the art.

System 100 may further comprise a transmitter 106, including an antenna for transmitting the signal, a digital to analog converter for converting the digitally formed signal from GPS signal generating module 104 and a mixer for mixing the signal with the RF carrier signal used in GPS signal transmissions.

Referring now to FIG. 2, there is shown a method for calculating, generating, and transmitting a broadcast-synchronized GPS signal. In step 200 of the method, the location of the target is received. In one embodiment, the location of the target may be received from intelligence. Alternatively, the location may be received from a radar system tracking the target. If the target location is received as a distance, azimuth, and elevation from a known location (i.e. the position of a radar antenna), or is received as some other metric, the target location may be converted into another coordinate system, such as Earth Centered, Earth Fixed (ECEF) or any other coordinate system that is suitable for determining the distance between the target and a satellite as required by the following steps. In one embodiment, the geodetic altitude of the target may be computed relative to mean sea level, and in an alternative embodiment, relative to the ellipsoid. One of ordinary skill will recognize that any method of computing the location of the target may be used.

In step 202, the location of visible satellites is determined. In an embodiment, system 100 may determine the location of each visible satellite by receiving the ephemeris data broadcasted by each visible satellite. In an alternative embodiment, the location of visible satellites may be computed from almanac file, received from at least one visible satellite, or pre-downloaded onto system 100. In yet another embodiment, the location of the visible satellites may be determined from a combination of ephemeris parameters received from each visible satellite and from a received or pre-downloaded almanac. For example, an almanac file may be preloaded into a system, and the location of the satellites computed for a given time based on the initial position of the satellites, and the motion of the satellites, as provided in the almanac file. In an embodiment, the visible satellites may be determined by calculating those satellites with a positive UP value (in ECEF coordinates, translated into an ENU reference frame relative to the target's position).

In an alternative embodiment, a subset of visible satellites may be selected for transmission. For example, four satellites is generally the minimum number required for geolocation. Four satellites may be selected from the visible satellites for transmission. The satellites may be selected according to which would provide the best dilution of precision value for the target. Alternatively, the satellites may be selected according to which satellites will remain visible for the greatest period of time, or any other factor as will be appreciated to a person of ordinary skill in the art. Step 202 may be repeated at regular intervals to ensure that only the visible satellites are being transmitted. For example, if a satellite rises to become visible, it may be selected for transmission. Alternatively, if a satellite sets, it may be deselected for transmission.

In step 204, GPS synchronization module 102 calculates a transmit delay for each satellite determined in step 202. The distance between the satellite and the target causes a delay from the time that the signal is transmitted by the satellite to the time that the signal is received by the target. To accurately recreate the received GPS signal, this delay must be computed for each transmitting satellite so that the transmitted signal will reach the target at the same time as the satellite broadcasted signal. By delaying transmission of the signal in concert with this computed delay, the retransmission signal reaches the target at the same time as the signal broadcasted by the satellite.

One of ordinary skill in the art will recognize that are a multitude of methods for calculating the transmit delay for each satellite. For example, the transmit delay may be calculated by determining observed delay from the satellite to the target, less the current satellite time offset and the delay observed from the transmitter to the target. To calculate the delay from the satellite to the target, the slant range may first be calculated according to the following equation:

$$R = \sqrt{(x_{sat} - x_{pos}) + (y_{sat} - y_{pos}) + (z_{sat} - z_{pos})}$$

where R represents the slant range, $x_{sat}$, $y_{sat}$, $z_{sat}$ are the coordinates of the satellite and $x_{pos}$, $y_{pos}$, $z_{pos}$ are the coordinates of the target. It should be noted that the above equation is valid for the ECEF coordinate system. One of ordinary skill in the art will readily recognize that each equation is merely an example and may be modified or otherwise transformed for any other coordinate system.

Once R is determined, the delay may be calculated for each satellite visible to the target receiver, based on R. In an embodiment, this delay may be calculated relative to a given GPS second, according to the equation:

$$\text{delay} = \frac{R}{c} - (A_{f0} + tA_{f1}) - \frac{R_a}{c}$$

Where R is the range computed above, c is the speed of light, $A_{f0}$ is the constant offset, $A_{f1}$ is the linear offset (e.g., seconds per second), t is the time relative to the epoch of the ephemeris (e.g. in seconds) (i.e., the current GPS second of the week), $R_a$ is the distance between the transmitter and the target. Usually, $A_{f0}$ and $A_{f1}$ may be obtained from the ephemeris data from the broadcasted signal or the preloaded almanac. $R_a$ may be obtained via a radar measurement or other means. The epoch of the ephemeris may be retrieved from the received GPS signal, or, where there is no received signal, may be estimated using an onboard clock, such as an atomic clock. The above equation is merely an example of a delay calculation that could be made and other equations may be used. For example, one of ordinary skill will recognize that this estimation could further include the Klobuchar ionospheric correction model, or other ionospheric model.

Because the GPS signal from each satellite continuously changes with respect to time, it is necessary that the calculated parameters for each satellite be updated, either continuously or periodically, such that the transmitted signal will not drift out of synchronization with the broadcasted signal. The change in each signal is due, in part, to the motion of the GPS satellites in medium earth orbit, which cause them to move with respect to the surface of the earth at approximately 3.9 Km per second. This creates a continuous change in slant ranges from the observer to the satellites as the satellites move through their orbits. This change in slant range is generally +/−600 meters per second depending on where the satellites are with respect to the observer (positive range when it is rising, zero when it is at its zenith, and negative when it is setting). This change in slant range further induces a predictable Doppler shift. This change may also result from the motion of the target, motion of the transmitter, System 100 clock drift, or other sources as will be obvious to a person of ordinary skill in the art. Thus, the parameters for creating the synchronized transmit signal must be recalculated to align with each broadcasted signal as it changes with the motion of the satellite. These updates may be calculated at discrete intervals. For example, the updates may be calculated at a rate of 1 Hz. However, one of ordinary skill will readily recognize that any update frequency may be used if desired. For example, for highly dynamic targets, such as maneuvering jet fighters, faster updates may be required. Conversely, for slow moving targets, slower updates may be permissible.

As described above, as result of the moving satellite, a Doppler shift is observed in signal broadcasted by the satellite. Accordingly, in step 206, to accurately simulate the broadcasted signal, GPS synchronization module 102 calculates a Doppler shift for each satellite determined in step 202. Generally this shift will be near to +/−6000 Hz, as will be recognized by one of ordinary skill in the art. In one embodiment, the Doppler shift may be calculated from the change in slant range with respect to the target over a given period of time, as discussed in more detail below.

While two points are required to calculate that change in slant, in an embodiment, at least one point will be a projected future value. For example, the change in slant range may be given by the following equation:

$$\Delta R = R_{current} - R_{next}$$

Where $R_{current}$ is the current observed slant range and $R_{next}$ is a future value of slant range. The future value of R may be calculated by predicting the next location of the satellite from the information obtained from the satellite's ephemeris and the next location of target, over some interval of time.

The next location of the target may be determined by deriving its velocity vector and projecting its position after the same interval of time. The velocity vector and/or next position of the target may be determined using radar trackers or other means known in the art. From the change in slant range, the Doppler shift may be calculated according to the following equation:

$$f_d = \frac{f_c \Delta R}{c}$$

One of ordinary skill in the art will recognize that if the Doppler shift is known, the difference in slant range may first be calculated according to the equation:

$$\Delta R = \frac{f_d c}{f_c}$$

Where $f_d$ the Doppler shift (e.g. in Hz), $f_c$ is the GPS L1 center frequency (e.g. 1575420000 Hz), and c is the speed of light. This equation returns the change in slant range for a given period of time. Thus, with a known initial slant range and lapse of time, the current slant range for any point in time may be calculated.

The Doppler shift also causes an effective compression or stretching of individual code chips. In step 208, GPS synchronization module 102 calculates an effective compression or stretching of individual code chips for each satellite determined in step 202. The compression or stretching of individual code chips may be simulated by chipping at a faster or slower rate to effectively stretch or compress the bits as desired. Thus, the compression or expansion of the chips may be modeled as an offset from the nominal frequency of 1.023 MHz broadcasted by the satellites. The chipping offset is generally +/−4 Hz. For example, the chipping offset may be calculated as +4 Hz, resulting in a total chipping frequency of 1027 Hz. One of ordinary skill in the art will recognize that there are a multitude of methods for calculating the chipping frequency offset. In an embodiment, this offset may be calculated for a given Doppler shift by the following equation:

$$\Delta f_{ct} = \frac{f_{ct}}{\left(1 + \frac{f_d}{f_c}\right)} - f_{ct}$$

where $f_{ct}$ is the nominal chipping frequency in Hz (1023000), $f_d$ is the Doppler shift (e.g. in Hz), $f_c$ is the GPS center frequency (e.g. 1575420000 Hz), and $\Delta f_{ct}$ is the resulting change in chipping frequency (i.e., offset). In practice, this change is between +/−4 Hz as the maximum Doppler shift is only between +/−6000 Hz. This offset may be simulated by the transmitter by chipping at a faster or slower rate to effectively stretch or compress bits as desired.

For convenience, $f_d$ may be solved based on the frequency of an offset. This is useful when the effects of quantization error in frequency generation are evaluated.

$$f_d = \left(\frac{f_{ct}}{\Delta f_{ct} + f_{ct}} - 1\right) f_c$$

These parameters may be calculated in any order as may be required by the data available or as is efficient. Furthermore, because of the movement of any combination the satellite, the target, the transmitter, step 204-208 must be updated periodically to remain synchronized with the broadcast signal. For example, these parameters may be recalculated and updated every second. Each parameter may also be recalculated at a different frequency as accuracy demands. In an alternative embodiment, the parameters may be calculated for a given satellite over a given future period of time. For example, if the signal for a given satellite may be computed for a future period of time, such as one hour, the offsets, delays, etc. may be calculated for that entire period and stored in a table or other format to be delivered to GPS signal generating module 104.

Next, in step 210, the navigation data and PRN may be computed for each satellite. The PRN is unique for each satellite, thus the proper PRN must be selected. Furthermore, the proper navigation message must be selected according to the position of the satellite. As will be obvious to one ordinary skill, the PRN code will vary per satellite and navigation message will vary per satellite as a function of time. The various PRN messages may be preloaded onto a storage medium and retrieved when needed. For example, the PRN messages for each satellite may be stored in a lookup table and accessed for each visible satellite selected in step 202. Similarly, the navigation message may be calculated from a broadcast signal or from a stored or received almanac. Because the time at the beginning of each subframe of the navigation updates continuously, a clock or other timer may be used to calculate this parameter.

In step 212, GPS signal generating module 104 formulates the baseband signals to be transmitted from the parameters calculated in steps 204-208 and the navigation data and PRN codes determined in step 210. Initially, GPS signal generating module 104 delays the proper amount before beginning to transmit on the desired code. The GPS signal generating module 104 may store the received navigation message from step 210 to be retrieved as the signal is generating. For example, GPS signal generating module 104 may modulate a new navigation bit from a stored queue of navigation bits.

One of ordinary skill in the art will understand that once the parameters are calculated in steps 204-210, these values may be passed to the GPS signal generating module 104 and updated as required. Alternately, the data may be continuously streamed from the GPS synchronization module 102 to the GPS signal generating module 104. One of ordinary skill in the art will recognize that some values may be continuously streamed while others may be updated periodically. For example, the PRN codes and navigation data may be calculated (or retrieved) and simply passed to the GPS signal generating module 104 to be generated and mixed into the final signals. Alternatively, the PRN and navigation data may be continuously streamed from GPS synchronization module 102 to be generated by GPS signal generating module 104. As an illustration, the navigation changes infrequently (roughly once every 4 hours), apart from the time, which continuously updates at the start of the subframe. Accordingly, the navigation message, including the time at the start of the subframe, may be calculated by GPS synchronization module 102 and streamed to GPS generating module 104. Alternatively, the navigation message may only be computed by the GPS synchronization module 102 and passed to GPS generating module 104 which generates the signal, and itself employs a counter to determine the time at the start of each subframe. In this way, the tasks performed by the GPS synchronization module 102 and GPS generating module 104 may be divided in different ways in different embodiments.

In step 214, the formulated signals may be converted to an analog signal and mixed with a carrier frequency for transmission.

According to an embodiment, a network of transmitters may be arranged to transmit to n number of targets. Because each transmitter may only transmit information accurate for a single target, a network of transmitters may be employed to transmit to a plurality of targets. Each transmitter may be connected to a unique system for calculating the broadcast-synchronized signals or multiple transmitters may each receive a unique broadcast-synchronized signal from a single system, calculating multiple broadcast synchronized signals for a plurality of targets.

Turning now to FIG. 3, an embodiment signal generating module 104. The embodiment shown in FIG. 3 may comprise a message decoder 302 configured to receive the navigation data and parameters from GPS synchronization module 102, and to break down the navigation data and parameters (collectively, control messages) into appropriate control signals for the firmware, software, FPGA, or ASIC. Message decoder 302 may provide the signals for n channels, as shown in FIG. 3. One of ordinary skill will appreciate that, in an alternate embodiment, the various components and modules of signal generating module 104 may receive the parameters and navigation data directly from the GPS synchronization module 102. For example, the GPS synchronization module may be configured to deliver each parameter to the correct component or module in a form that may be directly interpreted by the component (for example, GPS synchronization module 102 may deliver the navigation data directly to NAV Word FIFO 302, in a format that NAV Word 302 may directly interpret and implement). Alternatively, the functionality of message decoder 302 may be distributed amongst the various components of signal generating module 104 such that each component may receive and break out the data received form GPS synchronization module 102.

Signal generating module 104, in the embodiment shown in FIG. 3, may further comprise a NAV Word FIFO 304 configured to receive and form a first-in, first-out queue of the navigation words received from message decoder 302 (or, in an alternate embodiment, received directly from GPS synchronization module 102), such that the GPS synchronization module 102 may update the navigation message parameters without requiring real-time interaction. One of ordinary skill will recognize and appreciate that NAV Word FIFO 304 may receive and queue any unique navigation data for each channel that will be transmitted (the channels represented in overlay in FIG. 3).

As shown in FIG. 3, each channel of signal generating module 104 may comprise a numerically-controlled oscillator (NCO) 306 configured to apply the Doppler offset to each carrier according to the Doppler offset determined by the GPS synchronization module 102 and delivered by the message decoder 302 or directly by GPS synchronization module 102. Each numerically-controlled oscillator 306 may produce +6000 Hz or −6000 Hz according to the signal received and the Doppler offset calculated by GPS synchronization module 102 for the satellite represented by the channel.

Similarly, each channel of signal generating module 106 may include a NCO 308, for implementing the chipping offset according to the signal received from GPS synchronization module 102 or message decoder 302. Each NCO 308 may produce a signal at the rate determined by the chipping offset calculated by GPS synchronization module 102 for the satellite represented by the channel (notionally 1.023 MHz). As will be detailed below, the use of the NCO allows the chips to be stretched or shrunk.

Each channel of signal generating module 104, in the embodiment depicted in FIG. 3, may further include a Code Gen LFSR 310, configured to generate the PRN chipping code for the satellite associated with the channel. The code Gen LFSR 310 may, in an embodiment, be clocked by NCO 310. Thus, the chipping offset is implemented by varying the clock input of Code Gen LFSR 310.

Each channel of signal generating module 104, as shown in FIG. 3, may further include a Nav Word Modulator 312, which is configured to pull the next bit off the NAV Word FIFO 312 at (in an embodiment) 50 Hz.

Each channel of signal generating module 104 may further include multipliers 316, 318 which are configured to multiply together the outputs of the NCO 306, the NCO-clocked Code Gen LSFR 310, and the Nav Word Modulator 312, to produce one resulting signal which may be input into SV m-n IQ out Adder 320. SV m-n IQ out Adder 320 may, in turn, be configured to perform complex addition on each output signal from each channel and output one resulting signal. This signal may be multiplied by multiplier 324 with the baseband signal produced by baseband carrier signal generator 324 to be up-converted to the proper RF center frequency. One of ordinary skill will appreciate that the baseband frequency is lower than the carrier frequency of 1023.42 MHz. After being mixed with the baseband frequency, the signal may be delivered to a DAC for conversion to an analog signal before being sent to transmitter 106 for transmission.

FIG. 3 further depicts an embodiment of GPS synchronization module 102, and a configuration of logic modules as for implementing the method and algorithm described in FIG. 2.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be an example and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

A "module" or "component" as may be used herein, can include, among other things, the identification of specific functionality represented by specific computer software code of a software program. A software program may contain code representing one or more modules, and the code representing a particular module can be represented by consecutive or non-consecutive lines of code.

As will be appreciated by one skilled in the art, aspects of the present invention may be embodied/implemented as a computer system, method or computer program product. The computer program product can have a computer processor or neural network, for example, that carries out the instructions of a computer program. Accordingly, aspects of the present invention may take the form of an entirely hardware embodiment, an entirely software embodiment, and entirely firmware embodiment, or an embodiment combining software/firmware and hardware aspects that may all generally be referred to herein as a "circuit," "module," "system," or an "engine." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowcharts/block diagrams in the Figures illustrate the architecture, functionality, and operation of possible implementations of systems, methods, and computer program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of restoring a GPS signal, the comprising the steps of:
receiving a location of a target;
calculating, by a processor, for each of a plurality of GPS satellites visible to the target a GPS signal as it would be received by the target according to the location of the target and the respective location of each of the plurality of GPS satellites visible to the target;
transmitting, by an antenna, the calculated signal of each of the plurality of visible GPS satellites to the target, wherein the calculation is based, in part, on the location of the target, the respective location of each of the plurality of GPS satellites visible to the target, the location of the antenna, and time;
wherein the step of calculating comprises the step of calculating a transmit delay for each of the plurality of visible GPS satellites; and
wherein the transmit delay for each satellite is calculated according to the following equation:

$$\text{delay} = \frac{R}{c} - (A_{f0} + tA_{f1}) - \frac{R_a}{c}$$

wherein R is a slant range between each satellite and the target, c is the speed of light constant, $A_{f0}$ is a constant offset, $A_{f1}$ is a linear offset, t is a time relative to the epoch of the ephemeris, $R_a$ is the distance between the transmitter and the target, and c is the speed of light.

2. The method of claim 1, wherein the step of calculating comprises the step of calculating a Doppler shift for each of the plurality of visible GPS satellites.

3. The method of claim 1, wherein the step of calculating comprises the step of calculating a chipping frequency offset for each of the plurality of visible GPS satellites.

4. The method of claim 1, wherein the step of calculating comprises the step of determining navigation data for each of the plurality of visible GPS satellites.

5. The method of claim 2, wherein the Doppler shift for each of the plurality of visible GPS satellites is calculated according to the following equation:

$$f_d = \frac{f_c \Delta R}{c}$$

wherein $f_d$ is a frequency of the Doppler shift, $f_c$ is a GPS center frequency, $\Delta R$ is a change in slant range between each satellite and the target, and c is the speed of light constant.

6. The method of claim 5, wherein the change in slant rate is calculated according to the following equation:

$$\Delta R = R_{current} R_{next}$$

wherein $R_{current}$ is a slant range between the target and each satellite, and $R_{next}$ is a future estimated slant range between the target and each of the plurality of visible GPS satellites.

7. The method of claim 3, wherein the chipping frequency offset is calculated according to the following equation:

$$\Delta f_{ct} = \frac{f_{ct}}{\left(1 + \frac{f_d}{f_c}\right)} - f_{ct}$$

wherein $f_{ct}$ is a nominal chipping frequency, $f_d$ is a Doppler shift, and $f_c$ is a GPS center frequency.

8. The method of claim 4, wherein determining the navigation data comprises selecting, for each of the plurality of visible satellites, a PRN code, and determining a navigation data for the plurality of visible satellites according to a time.

9. A non-transitory storage medium, storing program code for implementing an algorithm on a processor for restoring a GPS signal, the processor being programmed to implement the algorithm comprising the steps of:
receiving a location of a target;
calculating, for each of a plurality of GPS satellites visible to the target, a GPS signal as it would be received by the target according to the location of the target and the respective location of each of the plurality of GPS satellites visible to the target, wherein the calculation is based, in part, on the location of the target, the respective location of each of the plurality of GPS satellites visible to the target, the location of an antenna, and time, and
providing each of the calculated GPS signals to the antenna such that the each calculated signal is transmitted to the target;
wherein the step of calculating comprises the step of a calculating a transmit delay for each of the plurality of visible GPS satellites; and
wherein the transmit delay for each satellite is calculated according to the following equation:

$$\text{delay} = \frac{R}{c} - (A_{f0} + tA_{f1}) - \frac{R_a}{c}$$

wherein R is a slant range between each satellite and the target, c is the speed of light constant, $A_{f0}$ is a constant offset, $A_{f1}$ is a linear offset, t is a time relative to the epoch of the ephemeris, $R_a$ is the distance between the transmitter and the target, and c is the speed of light.

10. The algorithm of claim 9, wherein the step of calculating comprises the step of calculating a Doppler shift for each of the plurality of visible GPS satellites.

11. The algorithm of claim 9, wherein the step of calculating comprises the step of calculating a chipping frequency offset for each of the plurality of visible GPS satellites.

12. The algorithm of claim 9, wherein the step of calculating comprises the step of determining navigation data for each of the plurality of visible GPS satellites.

13. The algorithm of claim 10, wherein the Doppler shift for each of the plurality of visible satellites is calculated according to the following equation:

$$f_d = \frac{f_c \Delta R}{c}$$

wherein $f_d$ is a frequency of the Doppler shift, $f_c$ is a GPS center frequency, $\Delta R$ is a change in slant range between each satellite and the target, and c is the speed of light constant.

14. The algorithm of claim 13, wherein the change in slant rate is calculated according to the following equation:
$\Delta R = R_{current} - R_{next}$
wherein $R_{current}$ is a slant range between the target and each satellite, and $R_{next}$ is a future estimated slant range between the target and each of the plurality of visible satellites.

15. The algorithm of claim 11, wherein the chipping frequency offset is calculated according to the following equation:

$$\Delta f_{ct} = \frac{f_{ct}}{\left(1 + \frac{f_d}{f_c}\right)} - f_{ct}$$

wherein $f_{ct}$ is a nominal chipping frequency, $f_d$ is a Doppler shift, and $f_c$ is a GPS center frequency.

16. The algorithm of claim 12, wherein determining the navigation data comprises selecting, for each of the plurality of visible satellites, a PRN code, and determining a navigation data for of the plurality of visible satellites according to a time.

17. A method of restoring a GPS signal, the comprising the steps of:
receiving a location of a target;
calculating, by a processor, for each of a plurality of GPS satellites visible to the target a GPS signal as it would be received by the target according to the location of the target and the respective location of each of the plurality of GPS satellites visible to the target;
transmitting, by an antenna, the calculated signal of each of the plurality of visible GPS satellites to the target, wherein the calculation is based, in part, on the location of the target, the respective location of each of the plurality of GPS satellites visible to the target, the location of the antenna, and time;
wherein the step of calculating comprises the step of calculating a Doppler shift for each of the plurality of visible GPS satellites; and
wherein the Doppler shift for each of the plurality of visible GPS satellites is calculated according to the following equation:

$$f_d = \frac{f_c \Delta R}{c}$$

wherein $f_d$ is a frequency of the Doppler shift, $f_c$ is a GPS center frequency, $\Delta R$ is a change in slant range between each satellite and the target, and c is the speed of light constant.

18. The method of claim 17, wherein the change in slant rate is calculated according to the following equation:
$\Delta R = R_{current} - R_{next}$
wherein $R_{current}$ is a slant range between the target and each satellite, and $R_{next}$ is a future estimated slant range between the target and each of the plurality of visible GPS satellites.

19. A method of restoring a GPS signal, the comprising the steps of:
receiving a location of a target;
calculating, by a processor, for each of a plurality of GPS satellites visible to the target a GPS signal as it would be received by the target according to the location of the target and the respective location of each of the plurality of GPS satellites visible to the target;
transmitting, by an antenna, the calculated signal of each of the plurality of visible GPS satellites to the target, wherein the calculation is based, in part, on the location of the target, the respective location of each of the plurality of GPS satellites visible to the target, the location of the antenna, and time;
wherein the step of calculating comprises the step of calculating a chipping frequency offset for each of the plurality of visible GPS satellites; and
wherein the chipping frequency offset is calculated according to the following equation:

$$\Delta f_{ct} = \frac{f_{ct}}{\left(1 + \frac{f_d}{f_c}\right)} - f_{ct}$$

wherein $f_{ct}$ is a nominal chipping frequency, $f_d$ is a Doppler shift, and $f_c$ is a GPS center frequency.

20. A non-transitory storage medium, storing program code for implementing an algorithm on a processor for restoring a GPS signal, the processor being programmed to implement the algorithm comprising the steps of:
receiving a location of a target;
calculating, for each of a plurality of GPS satellites visible to the target, a GPS signal as it would be received by the target according to the location of the target and the respective location of each of the plurality of GPS satellites visible to the target, wherein the calculation is based, in part, on the location of the target, the respective location of each of the plurality of GPS satellites visible to the target, the location of an antenna, and time, and
providing each of the calculated GPS signals to the antenna such that the each calculated signal is transmitted to the target;
wherein the step of calculating comprises the step of calculating a Doppler shift for each of the plurality of visible GPS satellites;
wherein the Doppler shift for each of the plurality of visible satellites is calculated according to the following equation:

$$f_d = \frac{f_c \Delta R}{c}$$

wherein $f_d$ is a frequency of the Doppler shift, $f_c$ is a GPS center frequency, $\Delta R$ is a change in slant range between each satellite and the target, and c is the speed of light constant.

21. The algorithm of claim 20, wherein the change in slant rate is calculated according to the following equation:

$\Delta R = R_{current} - R_{next}$ wherein $R_{current}$ is a slant range between the target and each satellite, and $R_{next}$ is a future estimated slant range between the target and each of the plurality of visible satellites.

22. A non-transitory storage medium, storing program code for implementing an algorithm on a processor for restoring a GPS signal, the processor being programmed to implement the algorithm comprising the steps of:

receiving a location of a target;

calculating, for each of a plurality of GPS satellites visible to the target, a GPS signal as it would be received by the target according to the location of the target and the respective location of each of the plurality of GPS satellites visible to the target, wherein the calculation is based, in part, on the location of the target, the respective location of each of the plurality of GPS satellites visible to the target, the location of an antenna, and time, and providing each of the calculated GPS signals to the antenna such that the each calculated signal is transmitted to the target;

wherein the step of calculating comprises the step of calculating a chipping frequency offset for each of the plurality of visible GPS satellites; and wherein the chipping frequency offset is calculated according to the following equation:

$$\Delta f_{ct} = \frac{f_{ct}}{\left(1 + \frac{f_d}{f_c}\right)} - f_{ct}$$

wherein $f_{ct}$ is a nominal chipping frequency, $f_d$ is a Doppler shift, and $f_c$ is a GPS center frequency.

* * * * *